Patented July 7, 1925.

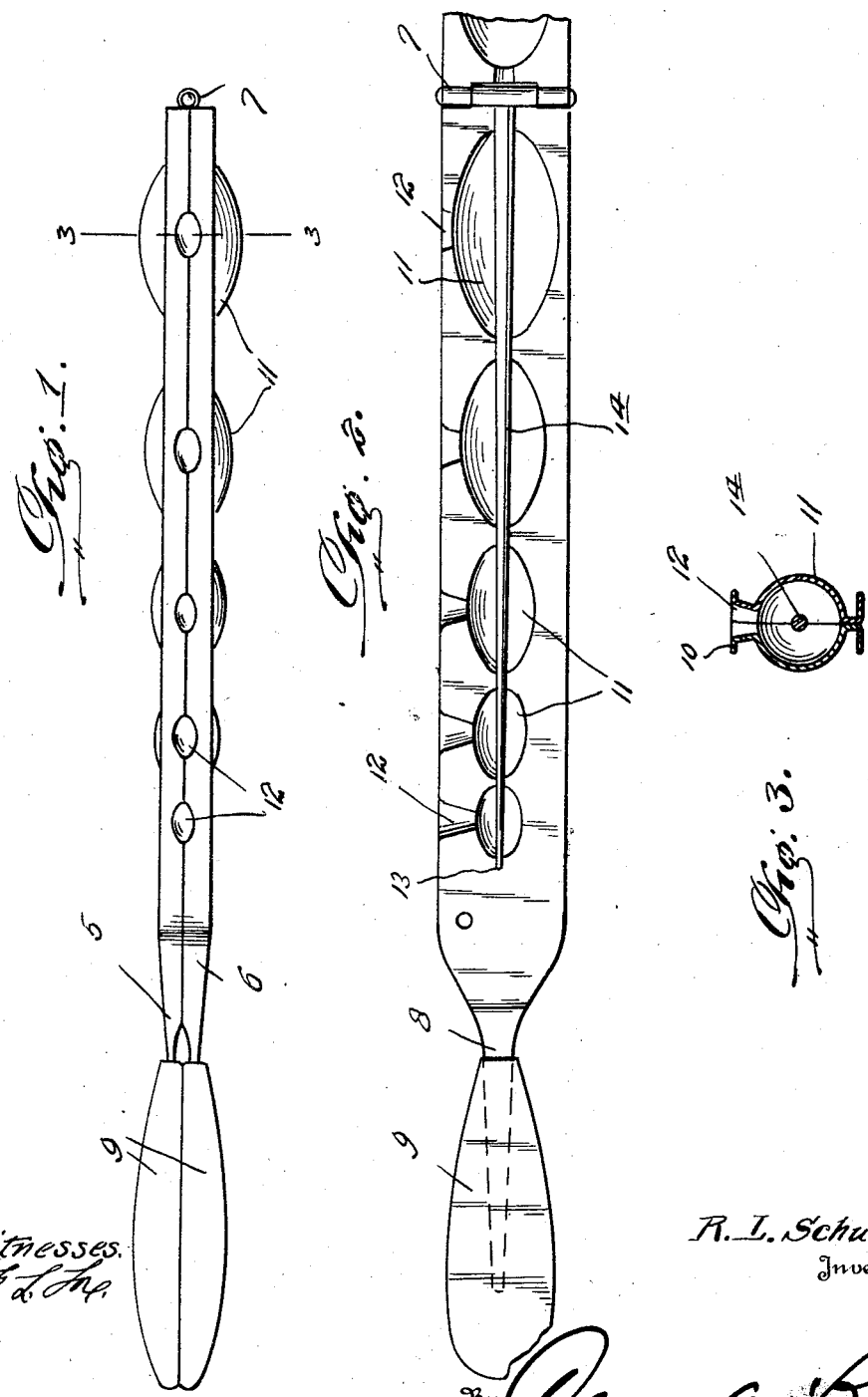

1,544,778

UNITED STATES PATENT OFFICE.

ROBERT L. SCHULTZ, OF NEW HAVEN, CONNECTICUT.

MOLD.

Application filed September 19, 1923. Serial No. 663,520.

*To all whom it may concern:*

Be it known that I, ROBERT L. SCHULTZ, a citizen of the United States, residing at New Haven, in the county of New Haven and State of Connecticut, have invented certain new and useful Improvements in Molds, of which the following is a specification.

In carrying out the present invention it is my purpose to provide a mold wherein fish sinkers may be manufactured in a novel, simple and expeditious manner.

The primary object of my invention resides in the provision of a mold that is extremely simple of construction and one that may be employed in the manufacture of fish sinkers by those unskilled in the art, the device comprising relatively few parts and these co-related in such a manner as to reduce the possibility of disarrangement to a minimum.

With the above and other objects in view as the nature of the invention will be better understood the same comprises the novel form, combination and arrangement of parts set forth in the following specification, shown in the accompanying drawing and claimed.

In the drawing wherein like reference characters indicate corresponding parts throughout the several views, Figure 1 is a top plan view of my improved mold in a closed position, Figure 2 is a fragmentary elevational view of my mold in an open position, and Figure 3 is a detail cross section taken substantially upon the line 3—3 of Figure 1.

Now having particular reference to the drawing, my novel mold comprises a pair of relatively elongated half sections each of which embodies a flat-like strip of sheet steel designated respectively 5 and 6, said half sections being hingedly joined together at their ends by a desirable form of connection 7. The opposite ends of each of these half sections are formed with an extension 8 upon which is fitted a handle 9 for obvious purposes.

The upper and lower edges of each of these sheet steel half sections are flanged outwardly as at 10 for reinforcement purposes, each of these half sections being additionally formed by pressing, with egg-shaped pockets 11 that extend in a longitudinal direction and are gradually reduced in size as clearly shown in Figure 2 it being apparent that when these half sections are swung together as per Figure 1, the pockets of each of the half sections will be mated for consequently providing an egg-shaped receptacle. These steel sections 5 and 6 are also formed by pressing or the like, with channels 12 that communicate at their lower ends with the respective pockets 11 and open at their upper ends at the upper edge of the half sections these depressions forming funnels as more clearly shown in Figure 3 when the sections are closed whereby the molten material may be poured into the receptacle formed by the egg-shaped pockets 11.

Each of the sections is formed with a longitudinal tapering channel 13 within which is to be positioned a tapering pin 14 whereby when the sections are closed and the molten material poured into the different receptacles, the sinkers resultant will be provided with a central bore for allowing the same to be threaded onto the fishing line.

In view of the above description when considered with the accompanying drawing, it will at once be apparent that I have provided a highly novel and simplified form of mold for use in the manufacturing of fish sinkers and even though I have herein set forth the most practical embodiment of the invention with which I am at the present time familiar, it is nevertheless to be understood that minor changes may be made within the invention without departing from the spirit and scope of the appended claim.

Having thus described my invention, what I claim as new and desire to secure by Letters Patent, is:—

A mold for simultaneously casting a number of objects of the same general design, but of different dimension comprising a pair of sections hingedly connected together, and provided at their inner sides with cavities, said cavities being aligned longitudinally of the sections, the inner faces of the sections being provided with recesses, which gradually decrease in transverse breadth and which connect at their ends with the ends of the adjacent cavities, said recesses being aligned with each other, and aligned with the centers of the cavities, and a tapered pin adapted to lie in the recesses and bridge all of the cavities, when the sections are closed, the surface of the pin being spaced from the surfaces of all of the cavities, but being in close contact with the surfaces of all of the recesses.

In testimony whereof I affix my signature.

ROBERT L. SCHULTZ.